United States Patent
Han et al.

(10) Patent No.: US 12,335,582 B2
(45) Date of Patent: Jun. 17, 2025

(54) VIDEO PROCESSING METHOD AND APPARATUS, DEVICE, AND STORAGE MEDIUM

(71) Applicant: Beijing Zitiao Network Technology Co., Ltd., Beijing (CN)

(72) Inventors: Mengyuan Han, Beijing (CN); Haiyang Guo, Beijing (CN); Pingyuan Ren, Beijing (CN); Liangying Shen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/771,455

(22) Filed: Jul. 12, 2024

(65) Prior Publication Data
US 2024/0364978 A1    Oct. 31, 2024

Related U.S. Application Data

(63) Continuation of application No. PCT/CN2023/086803, filed on Apr. 7, 2023.

(30) Foreign Application Priority Data

Apr. 28, 2022 (CN) ......................... 202210470742.5

(51) Int. Cl.
   *H04N 21/81* (2011.01)
(52) U.S. Cl.
   CPC ....... *H04N 21/816* (2013.01); *H04N 21/8113* (2013.01)

(58) Field of Classification Search
   CPC ..................... H04N 21/816; H04N 21/8113
   See application file for complete search history.

(56) References Cited

U.S. PATENT DOCUMENTS

2009/0210790 A1    8/2009  Thomas
2020/0336804 A1*  10/2020  Cui ..................... H04N 21/4781
                          (Continued)

FOREIGN PATENT DOCUMENTS

CN    108769814 A    11/2018
CN    111669639 A    9/2020
                (Continued)

OTHER PUBLICATIONS

ISA China National Intellectual Property Administration, International Search Report and Written Opinion Issued in Application No. PCT/CN2023/086803, Jul. 19, 2023, 11 pages.
(Continued)

*Primary Examiner* — Mulugeta Mengesha
(74) *Attorney, Agent, or Firm* — Alleman Hall & Tuttle LLP

(57) ABSTRACT

The present disclosure provides a video processing method and apparatus, a device and a storage medium, wherein the method comprises: in response to determining that a target video has been played for a preset duration, displaying a preset activity resource corresponding to the target video and a video generation control on a video playing page of the target video, wherein the target video belongs to a video information stream; and in response to a triggering operation on the video generation control, generating an activity video corresponding to the target video based on the preset activity resource.

20 Claims, 7 Drawing Sheets

(56) References Cited

U.S. PATENT DOCUMENTS

2023/0124461 A1    4/2023  Lin et al.
2023/0153123 A1*   5/2023  Zhang ................... G06F 3/0484
                                                     713/2

FOREIGN PATENT DOCUMENTS

| | | |
|---|---|---|
| CN | 112153288 A | 12/2020 |
| CN | 113132808 A | 7/2021 |
| CN | 113347480 A | 9/2021 |
| CN | 113473204 A | 10/2021 |
| CN | 114116053 A | 3/2022 |
| CN | 114339076 A | 4/2022 |
| WO | 2019228120 A1 | 12/2019 |

OTHER PUBLICATIONS

Japan Patent Office, Notice of Reasons for Refusal for Japanese Application No. 2024-544390, mailed Jan. 21, 2025, 12 pages.
Extended European Search Report for European Application No. 23794982.1, mailed Apr. 28, 2025, 13 pages.

* cited by examiner

In response to determining that a target video has been played for a preset duration, display a preset activity resource corresponding to the target video and a video generation control on a video playing page of the target video, wherein the target video belongs to a video information stream — 101

In response to a triggering operation on the video generation control, generate an activity video corresponding to the target video based on the preset activity resource — 102

FIG. 1

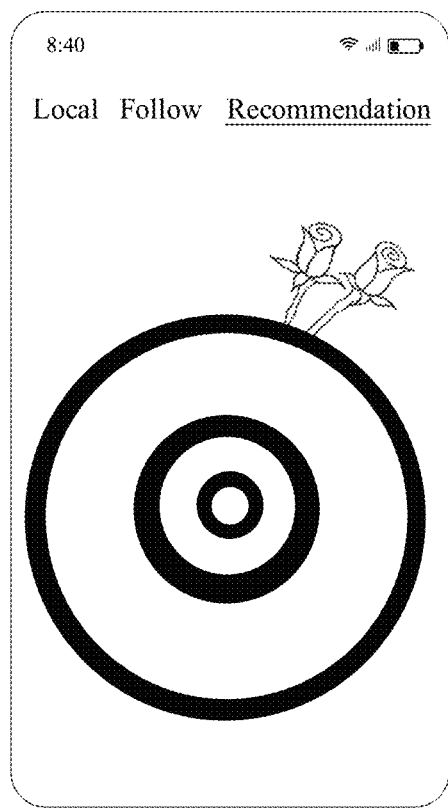

FIG. 2

VIDEO PROCESSING METHOD AND APPARATUS, DEVICE, AND STORAGE MEDIUM

CROSS-REFERENCE TO RELATED APPLICATIONS

This application is a continuation of International Patent Application No. PCT/CN2023/086803 filed on Apr. 7, 2023, which is based on and claims the benefit of priority to the Chinese patent application No. 202210470742.5 filed on Apr. 28, 2022. The disclosures of both applications are incorporated by reference herein in their entireties.

TECHNICAL FIELD

The present disclosure relates to the field of data processing, in particular to a video processing method and apparatus, a device and a storage medium.

BACKGROUND

With a popularization of smart equipment and a development of information technology, various short video platforms have emerged, and the short video platforms continuously launch series of activities with diversified themes to attract more users to participate.

In some related technologies, detailed information of different activities is displayed on different independent activity pages. During a process of watching a short video, if a user wants to participate in a related activity, a current video playing page has to jump to an activity page corresponding to the activity to enable the user to learn details of the activity. Only based on the activity page, participation in the activity can be achieved.

SUMMARY

In a first aspect, the present disclosure provides a video processing method, comprising:
  in response to determining that a target video has been played for a preset duration, displaying a preset activity resource corresponding to the target video and a video generation control on a video playing page of the target video, wherein the target video belongs to a video information stream; and
  in response to a triggering operation on the video generation control, generating an activity video corresponding to the target video based on the preset activity resource.

In some embodiments, the displaying the preset activity resource corresponding to the target video and the video generation control on the video playing page of the target video in response to determining that the target video has been played for the preset duration comprises:
  in response to determining that the target video has been played for the preset duration, displaying the preset activity resource corresponding to the target video, the video generation control and at least one information input control on the video playing page of the target video, wherein the at least one information input control is configured for receiving activity information inputted by a user; and
  the generating the activity video corresponding to the target video based on the preset activity resource in response to the triggering operation on the video generation control comprises:
  in response to the triggering operation on the video generation control, generating the activity video corresponding to the target video based on the preset activity resource and the activity information.

In some embodiments, the generating the activity video corresponding to the target video based on the preset activity resource and the activity information in response to the triggering operation on the video generation control comprises:
  in response to the triggering operation on the video generation control, obtaining a video generation template corresponding to the target video; and
  adding the preset activity resource and the activity information to the video generation template to generate the activity video corresponding to the target video.

In some embodiments, the method further comprises: after the generating the activity video corresponding to the target video based on the preset activity resource in response to the triggering operation on the video generation control:
  jumping from the video playing page to a video editing page and previewing the activity video on the video editing page.

In some embodiments, the preset activity resource comprises a lyric of a preset activity song, and the activity video previewed on the video editing page comprises the lyric dynamically displayed.

In some embodiments, the preset activity resource comprises a preset activity shooting prop, and the generating the activity video corresponding to the target video based on the preset activity resource in response to the triggering operation on the video generation control comprises:
  in response to the triggering operation on the video generation control, jumping from the video playing page to a video shooting page; and
  generating the activity video corresponding to the target video based on the preset activity shooting prop on the video shooting page.

In some embodiments, the method further comprises:
  in response to a first preset sliding operation acting on the video playing page of the target video, obtaining a target switching video corresponding to the target video based on the video information stream to which the target video belongs; and
  playing the target switching video on the video playing page.

In some embodiments, the preset activity resource comprises multiple activity resource packages comprised of at least one of a preset activity text, a preset activity image, a preset activity audio file, a preset activity video file, or a preset activity shooting prop, and the video processing method further comprises:
  in response to a second preset sliding operation acting on the video playing page of the target video, determining a target activity resource package from the multiple activity resource packages in the preset activity resource; and
  the generating an activity video corresponding to the target video based on the preset activity resource in response to a triggering operation on the video generation control comprising:
  in response to the triggering operation on the video generation control, generating the activity video corresponding to the target video based on the target activity resource package.

In some embodiments, activity resources for generating the activity video within the multiple activity resource packages are capable of being switched with each other.

In some embodiments, the method further comprises: displaying a sliding indicator on the video playing page to prompt the user to switch among the multiple activity resource packets to determine the target activity resource packet.

In a second aspect, the present disclosure provides a video processing apparatus, comprising:
- a displaying module configured to in response to determining that a target video has been played for a preset duration, display a preset activity resource corresponding to the target video and a video generation control on a video playing page of the target video, wherein the target video belongs to a video information stream; and
- a generating module configured to in response to a triggering operation on the video generation control, generate an activity video corresponding to the target video based on the preset activity resource.

In a third aspect, the present disclosure provides a non-transitory computer-readable storage medium in which instructions are stored, which when executed by a processor, cause the processor to implement the video processing method of any of the above embodiments.

In a fourth aspect, the present disclosure provides a video processing device, comprising: a memory, and a processor, wherein a computer program is stored on the memory and capable of running on the processor and the computer program when executed on the processor causes the processor to implement the video method of any of the above embodiments.

In a fifth aspect, the present disclosure provides a product, computer program comprising a computer program/instruction which when executed by a processor, cause the processor to implement the above video processing method of any of the above embodiments.

In a sixth aspect, the present disclosure provides a computer program, comprising: instructions which when executed by a processor, cause the processor to implement the video processing method of any of the above embodiments.

BRIEF DESCRIPTION OF THE DRAWINGS

The accompanying drawings here are incorporated into the specification and form a part of the present specification, illustrating embodiments in accordance with the present disclosure and used together with the description to explain the principles of the present disclosure.

In order to provide a clearer explanation of the technical solutions in the embodiments of the present disclosure or the prior art, a brief introduction will be given below to the accompanying drawings required in descriptions of the embodiments or the prior art. It is obvious to those skilled in the art that other drawings can also be obtained based on these accompanying drawings without the need for creative labor.

FIG. 1 is a flowchart of a video processing method provided in some embodiments of the present disclosure.

FIG. 2 is a schematic diagram of a video playing page provided in some embodiments of the present disclosure.

DETAILED DESCRIPTION

Figure 3:
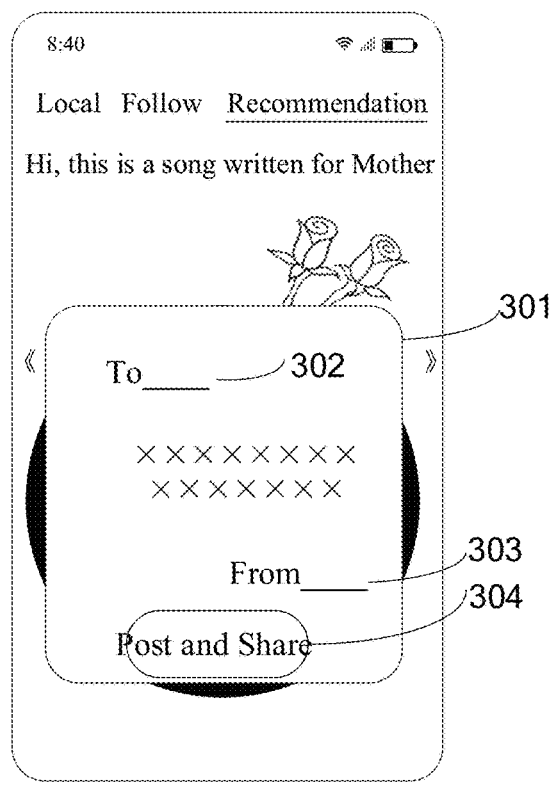
FIG. 3 is a schematic diagram of a video playing page provided in other embodiments of the present disclosure.

In order for better understandings of the above objectives, features, and advantages of the present disclosure, schemes of the present disclosure will be further described below. It should be noted that, if without conflict, the embodiments of the present disclosure and features in the embodiments can be combined with each other.

Many specific details are elaborated in the following descriptions to facilitate a full understanding of the present disclosure, but the present disclosure may be implemented in other ways different from those described herein; obviously, the embodiments in the description are only a part of the embodiments in the present disclosure, rather than the entire embodiments.

At present, With a popularization of smart equipment and a development of information technology, various short video platforms have emerged, and the short video platforms continuously launch series of activities with diversified themes to attract more users to participate.

In some related technologies, detailed information of different activities is displayed on different independent activity pages. During a process of watching a short video, if a user wants to participate in a related activity, a current video playing page has to jump to an activity page corresponding to the activity to enable the user to learn details of the activity. Only based on the activity page, participation in the activity can be achieved It can be seen that a participation path of the activity is complex, leading to a poor user experience.

For this reason, the present disclosure provides a video processing method, comprising: in response to determining that a target video has been played for a preset duration, displaying a preset activity resource corresponding to the target video and a video generation control on a video playing page of the target video, wherein the target video belongs to a video information stream; and in response to a triggering operation on the video generation control, generating an activity video corresponding to the target video based on the preset activity resource. In the embodiments of the present disclosure, by displaying the activity resources and the video generation control on the video playing page of the target video, a user is enabled to trigger the generation of the activity video based on the video playing page without a need for jumping to another activity page in the case of not leaving a video playing scene, thereby simplifying an activity participation path and improving the user's experience.

Based on this, some embodiments of the present disclosure provide a video processing method. Referring to FIG. 1, it is a flowchart of a video processing method provided in some embodiments of the present disclosure. The method comprises: steps S101 to S102.

In step S101, in response to determining that a target video has been played for a preset duration, a preset activity resource corresponding to the target video and a video generation control on a video playing page of the target video are displayed.

The target video belongs to a video information stream. The video information stream refers to an information stream that is continuously updated and presents video contents to a user. For example, on a video recommendation page, a video can be played based on a recommended video information stream. The target video can be an activity related video, for example, can be an activity promotion video, an activity introduction video, or the like.

The preset duration refers to a pre-set threshold for a playing duration of the target video. For example, the preset duration can be 5 seconds. In addition, the preset duration can also be a total duration of the target video, that is, in response to the target video being played to its end, the displaying the preset activity resource and the video generation control corresponding to the target video on the video playing page is triggered. Specifically, the preset duration can be set according to needs, and there are no restrictions on it in the present disclosure.

In some embodiments, assuming that the preset duration is 5 seconds, during a process of playing the target video on the video playing page based on the video information stream, if it is determined that the target video has been played for 5 seconds, the preset activity resource and the video generation control corresponding to the target video will be displayed on the video playing page of the target video.

The preset activity resource refers to an activity resource pre-set for an activity corresponding to the target video. For example, for Activity A, the preset activity resource can comprise a preset activity text, namely Activity A is displayed in a form of text.

It should be noted that the target video has a corresponding relationship with the preset activity resource. The preset activity resource can be pre-set based on an activity requirement corresponding to the target video. Specifically, the preset activity resources can comprise at least one of a preset activity text, a preset activity image, a preset activity audio file, a preset activity video file, or a preset activity shooting prop, and so on.

In some embodiments, in response to determining that the target video has been played for the preset duration, the preset activity resource corresponding to the target video, the video generation control and at least one information input control on the video playing page of the target video are displayed.

The at least one information input control is configured for receiving activity information inputted by a user. The activity information inputted by the user, for example, can comprise an activity greeting, activity participant information, and so on.

In some embodiments of the present disclosure, in response to determining that the target video has been played for the preset duration, the target video stops playing, and meanwhile the preset activity resource, the video generation control and the at least one information input control corresponding to the target video are displayed on the video playing page of the target video. A video screen when the target video stops playing can serve as a display background of the preset activity resource corresponding to the target video.

As shown in FIG. 2, it is a schematic diagram of a video playing page provided in some embodiments of the present disclosure. A playing screen of the target video at a time when the target video has been played for the preset duration is showed in FIG. 2. Specifically, in response to determining that the target video has been played for the preset duration, the target video stops playing and freezes in the playing screen shown in FIG. 2. The preset activity resource, the video generation control and the at least one information input control corresponding to the target video are displayed on the video playing page of the target video that displays the playing screen mentioned above, as shown in FIG. 2.

As shown in FIG. 3 which is a schematic diagram of a video playing page provided in other embodiments of the present disclosure, in response to the target video having been played for the preset duration, the preset activity resource corresponding to the target video, such as a Mother's Day blessing card 301, is displayed on the video playing page of the target video. On the blessing card is set an information input control 302, an information input control 303, and a video generation control 304. When a user clicks on the information input control 302, a keyboard pop-up window can pop up.

Figure 4:
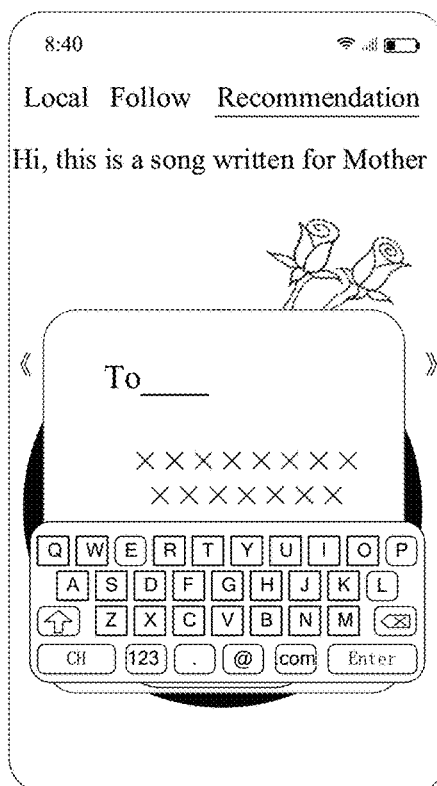
FIG. 4 is a schematic diagram of a video playing page provided in still other embodiments of the present disclosure.
Figure 5:
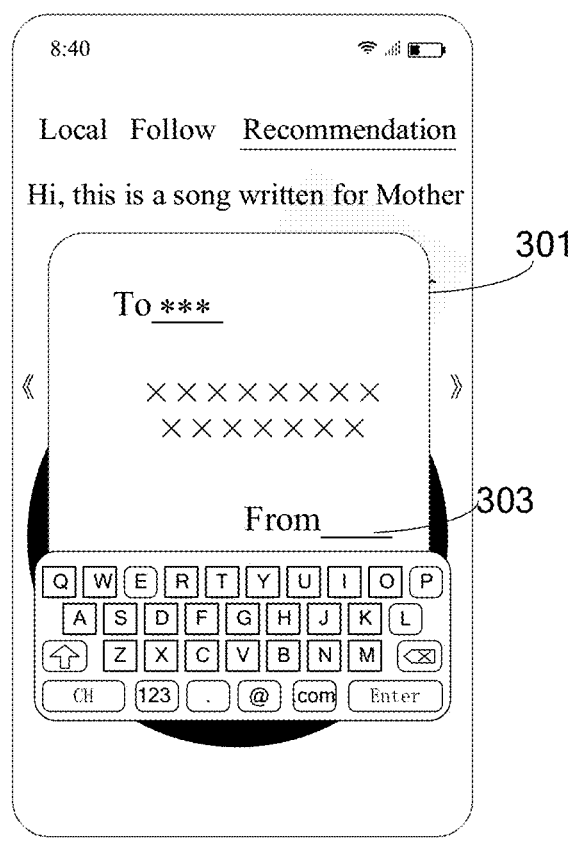
FIG. 5 is a schematic diagram of a video playing page provided in still other embodiments of the present disclosure.

As shown in FIG. 4 which is a schematic diagram of a video playing page provided in still other embodiments of the present disclosure, a user can input activity information, and after the input is completed, the user can close the keyboard pop-up window by sliding down. In some embodiments, a display position of the Mother's Day greeting card 301 can be adjusted. As shown in FIG. 5 which is a schematic diagram of a video playing page provided in still other embodiments of the present disclosure, when a user clicks on the information input control 303, in order to show the complete Mother's Day greeting card without being blocked by the keyboard pop-up window, the Mother's Day greeting card 301 can be moved upward for display.

In some embodiments, the preset activity resource corresponding to the target video can comprise a preset activity shooting prop. In response to determining that a target video has been played for the preset duration, the preset activity shooting prop and the video generation control corresponding to the target video are displayed on the video playing page of the target video. The video generation control is configured for triggering the generation of the activity video corresponding to the target video based on the preset activity shooting prop.

In the embodiments of the present disclosure, the preset activity shooting prop can be a popular prop or a prop related to the activity.

Figure 6:
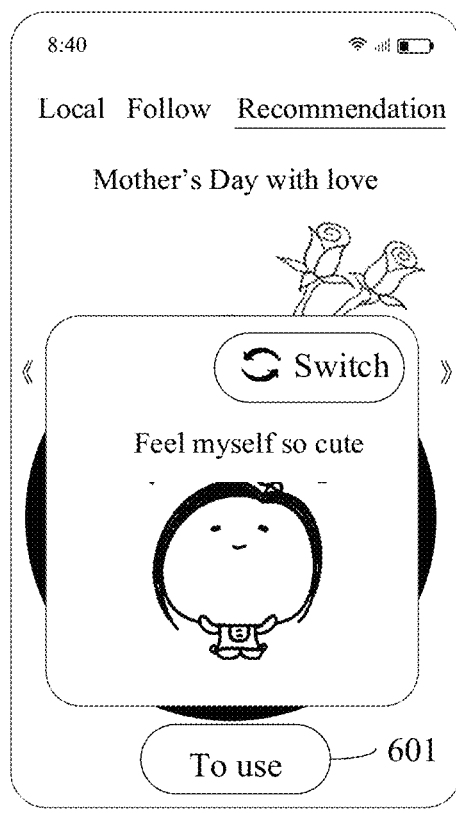
FIG. 6 is a schematic diagram of a video playing page provided in still other embodiments of the present disclosure.

As shown in FIG. 6 which a schematic diagram of a video playing page provided in still other embodiments of the present disclosure, in response to determining that a target video has been played for a preset duration, the preset activity shooting prop and a video generation control 601 corresponding to the target video are displayed on the video playing page. In some embodiments, a user can switch the preset activity shooting prop displayed on the video playing page by clicking on "Change".

In step S102, in response to a triggering operation on the video generation control, an activity video corresponding to the target video is generated based on the preset activity resource.

In some embodiments, in response to the triggering operation on the video generation control, a video generation template corresponding to the target video is obtained; and the preset activity resource and the activity information is added to the video generation template to generate the activity video corresponding to the target video.

In some embodiments, in response to determining that a target video has been played for a preset duration, the preset activity resource, a video generation control, and at least one information input control corresponding to the target video can be displayed on a video playing page of the target video. After receiving a triggering operation on the video generation control, a video generation template corresponding to the target video can be obtained, and the preset activity resource and activity information inputted in the at least one information input control can be added to the video generation template respectively to generate an activity video corresponding to the target video.

In some embodiments, during a process of adding the preset activity resource and the activity information inputted in the at least one information input control to the video generation template respectively, if no activity information is inputted in the at least one information input control (i.e. empty), default information corresponding to the at least one information input control can be filled into a position corresponding to the at least one information input control in the video generation template.

In some embodiments, during the process of adding the preset activity resource and the activity information inputted in the at least one information input control to the video generation template respectively, if activity information is not inputted in an information input control (i.e. empty), instead, only the activity information inputted in an information input control that is not empty and the preset activity resource will be filled into a position corresponding to the activity information and the preset activity resource in the video generation template to generate the activity video corresponding to the target video.

Figure 7:
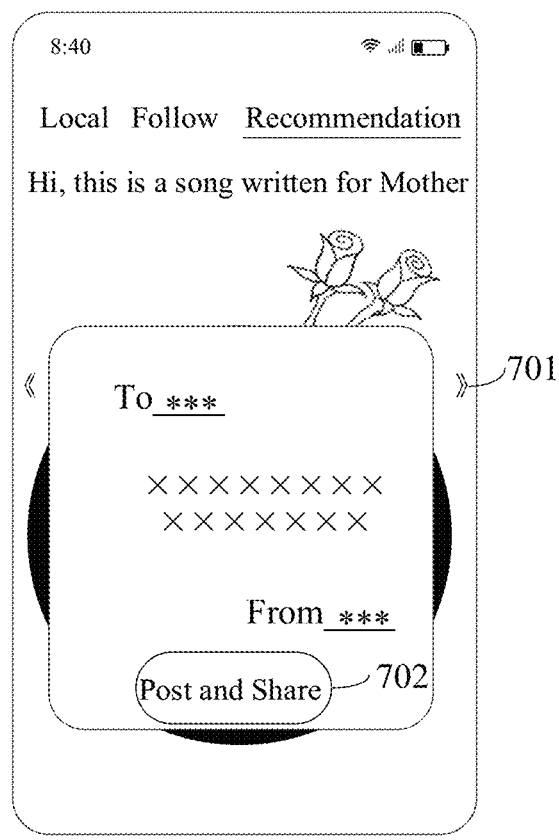
FIG. 7 is a schematic diagram of a video playing page provided in still other embodiments of the present disclosure.

As shown in FIG. 7 which a schematic diagram of a video playing page provided in still other embodiments of the present disclosure, after receiving the activity information inputted by the user, the user can click on the video generation control 702 to trigger an acquisition of the video generation template corresponding to the target video; the preset activity resource displayed on the video playing page and the activity information inputted by the user are added to the video generation template to generate the activity video corresponding to the target video. The activity video comprises the preset activity resource and the activity information inputted by the user. As shown in FIG. 7, the generated activity video not only comprises the preset activity resource, such as a Mother's Day greeting card, but also comprises activity information * * * inputted by the user.

In some embodiments, after in response to the triggering operation on the video generation control, a jump from the video playing page to a video editing page happens and the activity video is previewed on the video editing page.

In some embodiments of the present disclosure, after receiving an operation of clicking by the user on the video generation control on the video playing page, a jump from the video playing page to the video editing page is triggered, and the activity video is previewed on the video editing page.

Figure 8:
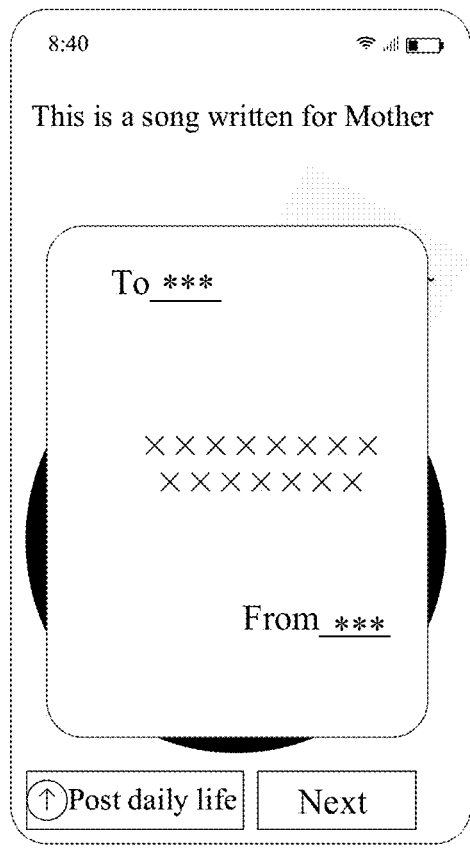
FIG. 8 is a schematic diagram of a video editing page provided in some embodiments of the present disclosure.

As shown in FIG. 8 which is a schematic diagram of a video editing page provided in some embodiments of the present disclosure, after generating the activity video corresponding to the target video based on the preset activity resource, the activity video is previewed on the video editing page, allowing the user to watch the activity video in advance before posting it. In some embodiments, as shown in FIG. 8, the user can trigger a post of the activity video by clicking on a button "Post daily Life". In some embodiments, as shown in FIG. 8, the user clicks on a button "Next", which can trigger further an editing operation for the activity video, such as adding a sticker, an effect, and so on.

In some embodiments, the preset activity resource may comprise a lyric of a preset activity song. After receiving the triggering operation on the video generation control, a jump from the video playing page to the video editing page happens, on which the activity video can be previewed. At the same time, the lyric of the preset activity song will be dynamically displayed in the previewed activity video.

In a practical application, the preset activity resources corresponding to the target video can comprise one or more of a preset activity text, a preset activity image, a preset activity audio file, a preset activity video file, or a preset activity shooting prop. The preset activity text refers to a text pre-set for the activity corresponding to the target video, such as a poetry fragment, a blessing, and so on. The preset activity image refers to an activity image pre-set for the activity corresponding to the target video, such as an image related to the activity corresponding to the target video. The preset activity audio file refers to an activity audio file pre-set for the activity corresponding to the target video, such as a music related to the activity corresponding to the target video. The preset activity video file refer to an activity video pre-set for the activity corresponding to the target video, such as a movie clip related to the activity corresponding to the target video. The preset activity shooting prop refers to an activity shooting prop pre-set for the activity corresponding to the target video, such as a prop related to the activity corresponding to the target video.

In some embodiments, the preset activity resource corresponding to the target video may comprise a preset activity song, as well as a lyric of the preset activity song.

When the preset activity resource corresponding to the target video is displayed on the video playing page of the target video, the preset activity song comprised in the preset activity resources can be played, the lyric of the preset activity song are displayed, and so on.

As shown in FIG. 7, after the user clicks on the video generation control 702 on the video playing page, the lyric based on the preset activity song displayed on the video playing page and the activity information inputted by the user are respectively added to positions corresponding to the lyric and the activity information in the video generation template, so as to generate the activity video corresponding to the target video, and jump from the video playing page to the video editing page.

As shown in FIG. 8, while the activity video is previewing on the video editing page, the lyric of the preset activity song comprised in the preset activity resource is dynamically displayed in the activity video that is previewing on the video editing page.

In some embodiments, the preset activity resource can also comprise preset activity shooting prop. In response to determining that the target video has been played for the preset duration, the preset activity shooting prop and the video generation control corresponding to the target video are displayed on the video playing page of the target video; and in response to the triggering operation on the video generation control, a jump from the video playing page to a video shooting page happens, and on the video shooting page, the activity video corresponding to the target video is generated based on the preset activity shooting prop.

In some embodiments of the present disclosure, in response to determining that the target video has been played for the preset duration, the preset activity shooting prop and the video generation control corresponding to the target video are displayed on the video playing page of the target video; after receiving the triggering operation on the video generation control, the jump from the video playing page to the video shooting page happens, and on the video shooting page, on which a shooting countdown can be set, the activity video corresponding to the target video is automatically generated based on the preset activity shooting prop after the countdown is completed.

As shown in FIG. 6 which is a schematic diagram of a target video playing page provided in some embodiments of the present disclosure, the target video playing page displays the preset activity shooting prop, and the user can switch the preset activity shooting prop displayed on the video playing page by clicking on Change. After the user selects a preset activity shooting prop, the user can click on the video generation control 601 to trigger the jump from the video playing page to the video shooting page. Based on the preset activity shooting prop selected by the user, a video is shot, and a shooting result video is obtained on the video shooting page, which is used as the activity video corresponding to the generated target video.

In the video processing method provided in the embodiments of the present disclosure, in response to determining that a target video has been played for the preset duration, the preset activity resource and the video generation control corresponding to the target video are displayed on the video playing page of the target video, wherein the target video belongs to the video information stream; in response to the triggering operation on the video generation control, the activity video corresponding to the target video is generated based on the preset activity resource. In the embodiments of the present disclosure, by displaying the preset activity resource and video generation control on the video playing page of the target video, the user is enabled to trigger the generation of the activity video based on the video playing page without a need for jumping to another activity page in the case of not leaving the video playing scene, thereby simplifying an activity participation path and improving the user's experience.

In some embodiments of the present disclosure, if a user is not interested in the target video, a video switching can be performed based on the video information stream to which the target video belongs. Specifically, the user can trigger a first preset sliding operation on the video playing page of the target video, thereby a target switching video corresponding to the target video is obtained based on the video information stream to which the target video belongs, and playing the target switching video on the video playing page.

The first preset sliding operation can be set as needed and can comprise a sliding up operation or a sliding down operation, or the like, triggered at any position on the video playing page of the target video. There are no restrictions on it in the present disclosure.

The target switching video refers to a video in the video information stream that is in a previous or next position adjacent to the target video. The user can switch from the target video to the target switching video based on the first preset sliding operation.

In a practical application, during the process of displaying the preset activity resource corresponding to the target video on the video playing page of the target video, the user can perform a sliding up operation or a sliding down operation to trigger a video switching function based on the video information stream to which the target video belongs. It can be seen that an interaction mode of video switching is simple and efficient.

In the embodiments of the present disclosure, if the user is not interested in the target video, video switching can be performed based on the video information stream to which the target video belongs, resulting in switching to the target switching video corresponding the target video and playing it on the video playing page. As the target video is located in the video information stream, when the user is not interested in the target video, the user can switch to the target switching video in the case of not leaving the video playing scene, without affecting the user's video viewing experience.

In some embodiments of the present disclosure, the preset activity resource comprises multiple activity resource packages comprised of at least one of a preset activity text, a preset activity image, a preset activity audio file, a preset activity video file, or a preset activity shooting prop.

Specifically, in response to a second preset sliding operation acting on the video playing page of the target video, a target activity resource package is determined from the multiple activity resource packages in the preset activity resource; in response to the triggering operation on the video generation control, the activity video corresponding to the target video is generated based on the target activity resource package.

In the embodiments of the present disclosure, the second preset sliding operation can comprise a sliding left operation or a sliding right operation triggered at any position on the video playing page of the target video. Based on the second preset sliding operation, the target activity resource package is determined from the multiple activity resource packages in the preset activity resource, and is used to generate the activity video corresponding to the target video.

As shown in FIG. 7, a sliding indicator 701 is displayed on the video playing page to prompt a user to switch among the multiple activity resource packets to determine the target activity resource packet. When a triggering operation on the video generation control 702 is received, an activity video corresponding to the target video is generated based on the target activity resource package.

In some embodiments, the preset activity resource corresponding to the target video comprise multiple activity resource packages, each of which can be any one or more of the following: a preset activity text, a preset activity image, a preset activity audio file, a preset activity video file, or a preset activity shooting prop. The user can trigger a sliding left operation or a sliding right operation at any position on the video playing page of the target video to switch among multiple activity resource packages, thereby determining the target activity resource package.

In some embodiments of the present disclosure, taking a Mother's Day activity as an example, the preset activity resource corresponding to the target video can comprise multiple activity resource packages. For example, a first activity resource package, a second activity resource package, etc. The first activity resource package can comprise a Mother's Day Blessing Card A. Referring to FIG. 7, in which the target video playing page displays the Mother's Day Blessing Card A in the first activity resource package, assuming that the second activity resource package comprises a Mother's Day Blessing Card B, a switching from the first activity resource package to the second activity resource package that the user can achieve by a sliding operation, triggers the activity resource displayed on the video playing page to switch from the Mother's Day Blessing Card A to the Mother's Day Blessing Card B.

Assuming that the preset activity resource corresponding to the target video mentioned above can also comprise a third activity resource package, which comprises a Mother's Day shooting prop. The user can switch to the third activity resource package by a sliding operation, to determine the third activity resource package as the target activity resource package, and achieve an effect of displaying the Mother's Day shooting prop in the third activity resource package on the video playing page. Assuming that the third activity resource package comprises multiple Mother's Day shooting props, switching between the Mother's Day shooting props can be achieved on the video playing page based on the multiple Mother's Day shooting props in the third activity resource package.

Based on the above method, a function of selecting the target activity resource package from the multiple activity resource packages comprised in the preset activity resource corresponding to the target video can be achieved, thereby generating an activity video based on the target activity resource package.

It should be noted that the activity resources used to generate the activity video in each activity resource package can be switched according to the user's preference. For example, when the activity resource package comprises multiple preset activity audio files, a user can select a target audio file based on its preference, to generate the activity video; when the activity resource package comprises multiple preset activity shooting props, the user can select a target shooting prop based on its preference, to generate the activity video, greatly enriching the user's options and improving the user's experience.

Figure 9:
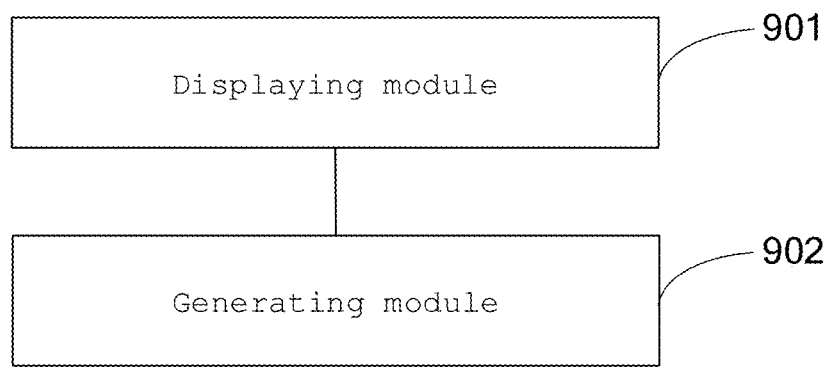
FIG. 9 is a schematic diagram of structure of a video processing apparatus provided in embodiments of the present disclosure.

Based on the above method embodiments, the present disclosure further provides a video processing apparatus, referring to FIG. 9, which is a schematic diagram of structure of a video processing apparatus provided in embodiments of the present disclosure. The apparatus comprises: a displaying module 901 and a generating module 902.

The displaying module 901 is configured to: in response to determining that a target video has been played for a preset duration, display a preset activity resource corresponding to the target video and a video generation control on a video playing page of the target video wherein the target video belongs to a video information stream.

The generating module 902 is configured to in response to a triggering operation on the video generation control, generate an activity video corresponding to the target video based on the preset activity resource.

In some embodiments, the displaying module is specifically configured to:
  in response to determining that the target video has been played for the preset duration, display the preset activity resource corresponding to the target video, the video generation control and at least one information input control on the video playing page of the target video, wherein the at least one information input control is configured for receiving activity information inputted by a user;
  correspondingly, the generating module is specifically configured to:
  in response to the triggering operation on the video generation control, generate the activity video corresponding to the target video based on the preset activity resource and the activity information.

In some embodiments, the generating module comprises:
  an acquiring submodule configured to, in response to the triggering operation on the video generation control, obtain a video generation template corresponding to the target video; and
  a first generating submodule configured to, add the preset activity resource and the activity information to the video generation template to generate the activity video corresponding to the target video.

In some embodiments, the apparatus further comprises:
  a previewing module configured to jump from the video playing page to a video editing page and preview the activity video on the video editing page.

In some embodiments, the preset activity resource comprises a lyric of a preset activity song, and the activity video previewed on the video editing page comprises the lyric dynamically displayed.

In some embodiments, the preset activity resource comprises a preset activity shooting prop, and the generating module comprises:
  a jumping submodule configured to in response to the triggering operation on the video generation control, jump from the video playing page to a video shooting page; and
  a second generating submodule configured to, generate the activity video corresponding to the target video based on the preset activity shooting prop on the video shooting page.

In some embodiments, the apparatus further comprises:
  an acquiring module configured to, in response to a first preset sliding operation acting on the video playing page of the target video, obtain a target switching video corresponding to the target video based on the video information stream to which the target video belongs;
  a playing module configured to, play the target switching video on the video playing page.

In some embodiments, the preset activity resource comprises multiple activity resource packages comprised of at least one of a preset activity text, a preset activity image, a preset activity audio file, a preset activity video file, or a preset activity shooting prop and the apparatus further comprises:
  a determining module configured to in response to a second preset sliding operation acting on the video playing page of the target video, determine a target activity resource package from the multiple activity resource packages in the preset activity resource; and
  correspondingly, the generating module is specifically configured to:
  in response to the triggering operation on the video generation control, generate the activity video corresponding to the target video based on the target activity resource package.

In the video processing apparatus provided in the embodiments of the present disclosure, in response to determining that the target video has been played for the preset duration, the preset activity resource and the video generation control corresponding to the target video are displayed on a video playing page of the target video, wherein the target video belongs to the video information stream; in response to the triggering operation on the video generation control, the activity video corresponding to the target video is generated based on the preset activity resource. In the embodiments of the present disclosure, by displaying the preset activity resource and video generation control on the video playing page of the target video, the user is enabled to trigger the generation of the activity video based on the video playing page without a need for jumping to another activity page in the case of not leaving the video playing scene, thereby simplifying an activity participation path and improving the user's experience.

In addition to the aforesaid method and device, the embodiments of the present disclosure also provide a computer-readable storage medium, in which instructions are stored; when the instructions are run on a processor, the processor is enabled to implement the video processing method described in the embodiments of the present disclosure.

The embodiments of the present disclosure also provide a computer program product, comprising a computer program/instruction that implements the video processing method described in the embodiments of the present disclosure when executed by a processor.

Figure 10:
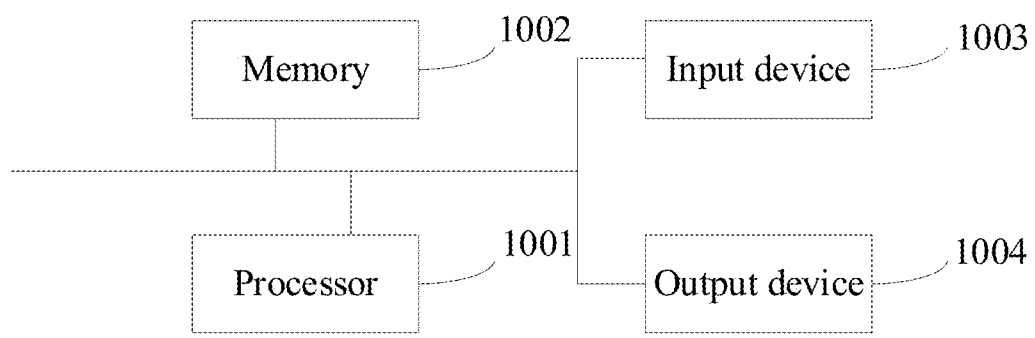
FIG. 10 is a schematic diagram of structure of a video processing device provided in embodiments the present disclosure.

In addition, the embodiments of the present disclosure also provide a video processing device, as shown in FIG. 10, which can comprise:

a processor 1001, a memory 1002, an input device 1003, and an output device 1004. The number of the processors 1001 in the video processing device can be one or more, for example, one processor as shown in FIG. 10. In some embodiments of the present disclosure, the processor 1001, memory 1002, input device 1003, and output device 1004 can be connected via a bus or other means, wherein, a bus connection is taken as an example in FIG. 10.

The memory 1002 can be used to store software programs and modules, while the processor 1001 executes various functional applications and data processing of the video processing device by running software programs and modules stored in the memory 1002. The memory 1002 can mainly comprise a program storage area and a data storage area, wherein the program storage area can store an operating system, an application program required for at least one function, etc. In addition, the memory 1002 can comprise high-speed random access memory and can also comprise a non-volatile memory, for example, at least one disk storage device, flash memory device, or other volatile solid-state storage device. The input device 1003 can be used to receive input numerical or character information, as well as generate signal inputs related to user settings and functional control of the video processing device.

Specifically in the present embodiment, the processor 1001 will load executable files corresponding to one or more processes of application programs into the memory 1002 according to the following instructions, and run the application programs stored in the memory 1002, thereby realizing various functions of the video processing device mentioned above.

It should be noted that in the present text, relational terms such as "first" and "second", etc., are only used to distinguish one entity or operation from another entity or operation, and do not necessarily require or imply any actual relationship or order between these entities or operations. Moreover, the terms "comprise", "include", or any other variation thereof are intended to encompass nonexclusive inclusion, such that a process, method, item, or equipment that comprises a series of elements not only comprises those elements, but also comprises other elements that are not explicitly listed, or also comprises elements inherent to such process, method, item, or equipment. Without further limitations, the elements limited by the statement "comprising one . . . " do not exclude the existence of other identical elements in the process, method, item, or equipment that comprises the aforesaid elements.

The above is only the specific implementations of the present disclosure, which enables those skilled in the art to understand or realize present the disclosure. Various modifications to these embodiments will be apparent to those skilled in the art, and the general principles defined herein can be realized in other embodiments without departing from the spirit or scope of the present disclosure. Therefore, the present disclosure will not be limited to the embodiments described herein, but will conform to the widest scope consistent with the principles and novel features disclosed herein.

What is claimed is:

1. A video processing method, comprising:
in response to determining that a target video has been played for a preset duration, displaying a preset activity resource corresponding to the target video and a video generation control on a video playing page of the target video, wherein the target video belongs to a video information stream;
in response to a triggering operation on the video generation control, generating an activity video corresponding to the target video based on the preset activity resource; and
switching from the video playing page to a video editing page and previewing the activity video on the video editing page.

2. The video processing method according to claim 1, wherein:
the displaying the preset activity resource corresponding to the target video and the video generation control on the video playing page of the target video in response to determining that the target video has been played for the preset duration comprises:
in response to determining that the target video has been played for the preset duration, displaying the preset activity resource corresponding to the target video, the video generation control and at least one information input control on the video playing page of the target video, wherein the at least one information input control is configured for receiving activity information inputted by a user; and
the generating the activity video corresponding to the target video based on the preset activity resource in response to the triggering operation on the video generation control comprises:
in response to the triggering operation on the video generation control, generating the activity video corresponding to the target video based on the preset activity resource and the activity information.

3. The video processing method according to claim 2, wherein the generating the activity video corresponding to the target video based on the preset activity resource and the activity information in response to the triggering operation on the video generation control comprises:
in response to the triggering operation on the video generation control, obtaining a video generation template corresponding to the target video; and
adding the preset activity resource and the activity information to the video generation template to generate the activity video corresponding to the target video.

4. The video processing method according to claim 1, wherein the preset activity resource comprises a lyric of a preset activity song, and the activity video previewed on the video editing page comprises the lyric dynamically displayed.

5. The video processing method according to claim 1, wherein the preset activity resource comprises a preset activity shooting prop, and the generating the activity video corresponding to the target video based on the preset activity resource in response to the triggering operation on the video generation control comprises:

in response to the triggering operation on the video generation control, jumping from the video playing page to a video shooting page; and generating the activity video corresponding to the target video based on the preset activity shooting prop on the video shooting page.

6. The video processing method according to claim 1, further comprising:

in response to a first preset sliding operation acting on the video playing page of the target video, obtaining a target switching video corresponding to the target video based on the video information stream to which the target video belongs; and playing the target switching video on the video playing page.

7. The video processing method according to claim 1, wherein the preset activity resource comprises multiple activity resource packages comprised of at least one of a preset activity text, a preset activity image, a preset activity audio file, a preset activity video file, or a preset activity shooting prop, and the video processing method further comprises:

in response to a preset sliding operation acting on the video playing page of the target video, determining a target activity resource package from the multiple activity resource packages in the preset activity resource, wherein:

the generating the activity video corresponding to the target video based on the preset activity resource in response to the triggering operation on the video generation control comprises:

in response to the triggering operation on the video generation control, generating the activity video corresponding to the target video based on the target activity resource package.

8. The video processing method according to claim 7, wherein activity resources for generating the activity video within the multiple activity resource packages are capable of being switched with each other.

9. The video processing method according to claim 7, further comprising:

displaying a sliding indicator on the video playing page to prompt the user to switch among the multiple activity resource packets to determine the target activity resource packet.

10. A non-transitory computer-readable storage medium, wherein the computer-readable storage medium stores instructions, which when executed by a processor, cause the processor to execute the video processing method according to claim 1.

11. A video processing device, comprising:

a memory, and a processor, wherein a computer program is stored on the memory and capable of running on the processor, and the computer program when executed on the processor causes the processor to:

in response to determining that a target video has been played for a preset duration, display a preset activity resource corresponding to the target video and a video generation control on a video playing page of the target video, wherein the target video belongs to a video information stream;

in response to a triggering operation on the video generation control, generate an activity video corresponding to the target video based on the preset activity resource; and switch from the video playing page to a video editing page and preview the activity video on the video editing page.

12. The video processing device according to claim 11, wherein:

the displaying the preset activity resource corresponding to the target video and the video generation control on the video playing page of the target video in response to determining that the target video has been played for the preset duration comprises:

in response to determining that the target video has been played for the preset duration, displaying the preset activity resource corresponding to the target video, the video generation control and at least one information input control on the video playing page of the target video, wherein the at least one information input control is configured for receiving activity information inputted by a user; and the generating the activity video corresponding to the target video based on the preset activity resource in response to the triggering operation on the video generation control comprises:

in response to the triggering operation on the video generation control, generating the activity video corresponding to the target video based on the preset activity resource and the activity information.

13. The video processing device according to claim 12, wherein the generating the activity video corresponding to the target video based on the preset activity resource and the activity information in response to the triggering operation on the video generation control comprises:

in response to the triggering operation on the video generation control, obtaining a video generation template corresponding to the target video; and adding the preset activity resource and the activity information to the video generation template to generate the activity video corresponding to the target video.

14. The video processing device according to claim 11, wherein the preset activity resource comprises a lyric of a preset activity song, and the activity video previewed on the video editing page comprises the lyric dynamically displayed.

15. The video processing device according to claim 11, wherein the preset activity resource comprises a preset activity shooting prop, and the generating the activity video corresponding to the target video based on the preset activity resource in response to the triggering operation on the video generation control comprises:

in response to the triggering operation on the video generation control, jumping from the video playing page to a video shooting page; and generating the activity video corresponding to the target video based on the preset activity shooting prop on the video shooting page.

16. The video processing device according to claim 11, wherein the computer program further causes the processor to:

in response to a first preset sliding operation acting on the video playing page of the target video, obtain a target switching video corresponding to the target video based on the video information stream to which the target video belongs;

play the target switching video on the video playing page.

17. The video processing device according to claim 11, wherein the preset activity resource comprises multiple activity resource packages comprised of at least one of a preset activity text, a preset activity image, a preset activity audio file, a preset activity video file, or a preset activity shooting prop, and the computer program further causes the processor to:

in response to a preset sliding operation acting on the video playing page of the target video, determine a target activity resource package from the multiple activity resource packages in the preset activity resource, wherein:

the generating the activity video corresponding to the target video based on the preset activity resource in response to the triggering operation on the video generation control comprises:

in response to the triggering operation on the video generation control, generating the activity video corresponding to the target video based on the target activity resource package.

18. The video processing device according to claim 17, wherein activity resources for generating the activity video within the multiple activity resource packages are capable of being switched with each other.

19. A video processing method, comprising:

in response to determining that a target video has been played for a preset duration, displaying a preset activity resource corresponding to the target video and a video generation control on a video playing page of the target video, wherein the target video belongs to a video information stream, wherein the preset activity resource comprises multiple activity resource packages comprised of at least one of a preset activity text, a preset activity image, a preset activity audio file, a preset activity video file, or a preset activity shooting prop;

in response to a preset sliding operation acting on the video playing page of the target video, determining a target activity resource package from the multiple activity resource packages in the preset activity resource; and in response to a triggering operation on the video generation control, generating an activity video corresponding to the target video based on the target activity resource package.

20. The video processing method according to claim 19, wherein:

the displaying the preset activity resource corresponding to the target video and the video generation control on the video playing page of the target video in response to determining that the target video has been played for the preset duration comprises:

in response to determining that the target video has been played for the preset duration, displaying the preset activity resource corresponding to the target video, the video generation control, and at least one information input control on the video playing page of the target video, wherein the at least one information input control is configured for receiving activity information inputted by a user; and the generating the activity video corresponding to the target video based on the target activity resource package in response to the triggering operation on the video generation control comprises:

in response to the triggering operation on the video generation control, generating the activity video corresponding to the target video based on the target activity resource package and the activity information.

\* \* \* \* \*